Oct. 27, 1936.                G. E. ROWE                    2,059,147
        METHOD OF MAKING BOTTLES AND LIKE ARTICLES OF HOLLOW GLASSWARE
                         Filed March 28, 1934
*Fig. 2.*   *Fig. 3.*   *Fig. 4.*
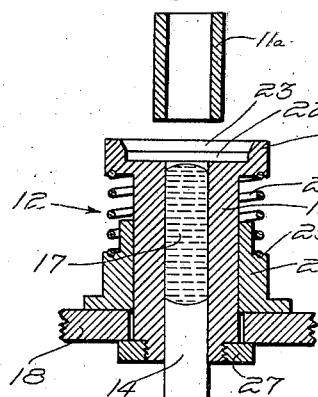 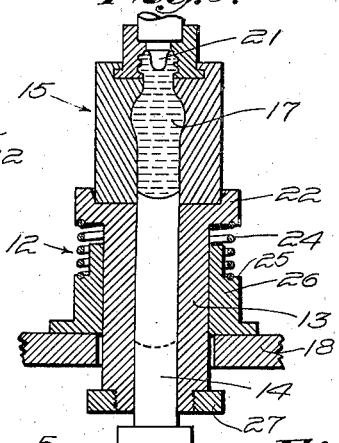 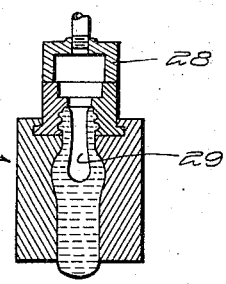
*Fig. 5.*   *Fig. 6.*
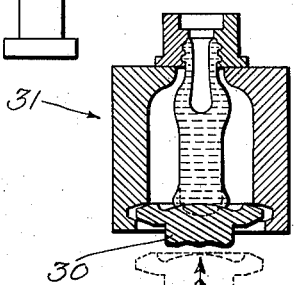 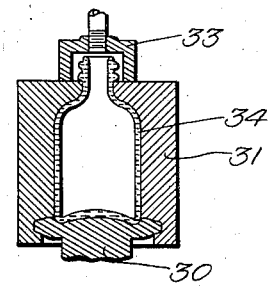
*Fig. 1.*
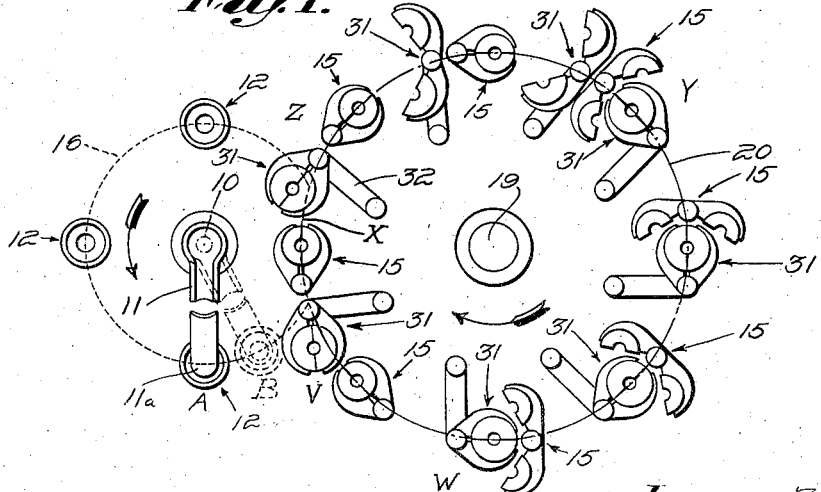
Witness:
W. B. Thayer
Inventor:
George E. Rowe
By Brown & Parham
Attorneys Patented Oct. 27, 1936

2,059,147

UNITED STATES PATENT OFFICE 2,059,147

METHOD OF MAKING BOTTLES AND LIKE ARTICLES OF HOLLOW GLASSWARE

George E. Rowe, Wethersfield, Conn., assignor to Hartford-Empire Company, Hartford, Conn., a corporation of Delaware Application March 28, 1934, Serial No. 717,694

1 Claim. (Cl. 49—80)

This invention relates generally to methods of making bottles and like articles of hollow glassware and more particularly to the manufacture of such articles by the use of glassware forming machines of the well-known Owens type of construction, that is, machines having molds which are disposed in upright position with their bottom ends downward at the time such molds are to be charged with glass.

In the charging of molds of glassware forming machines of the Owens type of construction, it is usual to cause each of such molds to dip in its turn until its open lower end is immersed in the molten glass of a supply pool. Suction then is applied to the interior of the mold cavity and the resultant differential pressures on the glass at the lower end of the mold cause rapid filling of such mold. A neck pin ordinarily is supported in the upper end of the mold and part of the glass entering the mold is drawn upwardly around the neck pin to provide for an initial blow aperture in the glass in the mold and to form the neck portion of the article being made. The glass in the mold is severed from the supply body by a suitable shear blade or other known severing means.

A mold that has been charged by suction in the manner just described is filled with glass for substantially the full length of its cavity. The glass blank in such mold is adapted to be fabricated into a bottle or like article of glassware without causing so-called "settle wave" or "counterblow wave" lines in the side walls thereof. Such a bottle or like article, if made by a process that employs a feeder-fed machine, in which an inverted mold is charged with a separated mass of glass that is less than the full capacity of a mold cavity, ordinarily has such wave lines in its side walls unless special and recently developed measures have been taken to prevent their formation.

The Owens suction method of forming bottles or like articles of glassware has features of advantage over the feeder-fed machine process but it also has certain features of disadvantage, some of which arise from the necessity of dipping the open lower ends of the molds into a pool of glass and drawing glass into the mold cavities by suction.

An object of the present invention is to effect the charging of upright open bottom molds of a forming machine of the Owens type with separated charges of glass of sufficient mass to fill the mold cavities for substantially their full length so that "full blanks" will be formed therein and the subsequent steps of the Owens suction machine process may be employed in the manufacture of a bottle or like article but without requiring the molds to be dipped into a pool of molten glass for the charging of such molds.

A further object of the invention is to provide a simple, efficient and reliable means for charging from below open bottom upright molds of a machine of the Owens type with separated charges of glass of sufficient size to fill the mold cavities for substantially their full length and so that the upper end portion of the glass in the mold will be formed into the neck portion of the article being made.

Other objects and advantages of the invention will be understood from the following description of a practical application thereof, as shown in the accompanying drawing, in which:

Figure 1 is a diagrammatic plan view, showing improved mold charging means of the present invention as provided for use in charging blank molds of a machine of the Owens type, only the molds of such machine and the general path of movement of such molds being shown;

Fig. 2 is a vertical section through one of the mold charging devices of the assembly shown in Fig. 1, the view showing such mold charging device after it has received a charge of glass from an associate feeder;

Fig. 3 is a view generally similar to Fig. 2 but showing the charging device in cooperative relation with the lower end of an upright mold of a machine of the Owens type after the glass charge has been delivered by the charging device to the cavity of the mold;

Fig. 4 is a vertical section through the mold of Fig. 3 after air has been admitted to the initial blow aperture in the glass therein to form a bubble in the glass blank, the bottom of the mold being open to permit extrusion of sufficient glass to provide space for the bubble;

Fig. 5 is a view showing the halves of a finishing mold about to close about the blank after the removal of such blank from the body of the blank mold; and Fig. 6 is a view showing the finally blown article of glassware in the finishing mold.

In Fig. 1, a feeder outlet is indicated by the numeral 10. It will be understood that the feeder may embody any suitable known structure and be equipped with any suitable known mechanism for controlling the production of the respective charges, so that the weight and shape of each of such charges can be accurately controlled within practical limits.

Beneath the feeder outlet is the receiving end of a chute or trough 11, the outer end portion of which, designated 11a, is designed to deliver a separated charge of glass downward to an underlying mold charging device 12.

The charging device 12 is shown to advantage in Figs. 2 and 3. Such device includes a cup having a substantially cylindrical body portion 13. The bottom of this cup is movable, and, in the form shown, consists of the upper end portion of a ram or piston 14. The cavity of the cup of the charging device has a length greater than its diameter and is adapted to receive a charge for an upright open-bottomed blank mold 15 of a glassware forming machine of the Owens type. The diameter of the cavity of the cup of the charging device therefore preferably approximates that of the lower end portion of the cavity of the mold to be charged.

A plurality of the charging devices 12 may be provided and arranged in spaced relation around the axis of the feeder outlet 10. Suitable mechanism may be provided to move these charging devices continuously in a closed path, such as that indicated at 16 in Fig. 1, so that each charging device will be brought in its turn beneath the outer end of the chute 11. The outer end of the chute and the charging device therebeneath may be moved in register with each other for a sufficient distance to permit a charge that has been produced by the feeder and discharged from the orifice 10 to be delivered by the chute 11 downwardly into the cup of the charging device. For example, the outer end of the chute 11 may swing about the axis of the feeder outlet with each charging device in turn from the station A to the station B in Fig. 1, the chute then swinging back to the station A, and remaining there until the next charging device 12 moves into register therewith. During this movement of the charging device from station A to station B, a charge such as that indicated at 17 in Fig. 2, is deposited in the cup of the charging device, the bottom of such cup being in a lowered position, as shown in Fig. 2.

Any suitable carrier, a portion of one being shown at 18 in Fig. 2, may be employed to move the charging devices 12 continuously around the axis of the feeder outlet. Likewise, any suitable known mechanism may be employed to support and oscillate the chute 11 so that its outer end will be moved for a short distance with each of the successively presented charging devices.

The mold 15, shown in Figs. 3 and 4, may be one of a series of parison or blank molds, of a forming machine of the Owens type. These molds may be supported by any suitable carrier or in any suitable known manner so as to be moved in spaced relation with each other in a substantially circular path around a given point, such as the axis of the column indicated at 19 in Fig. 1. A general path of movement of the blank molds is indicated at 20 in Fig. 1.

The cup of a charging device 12 and the mold 15 to be charged may move in register with each other for a distance sufficient to permit the transfer of the mold charge from the charging device to the mold if the latter is to be charged while moving. Either the mold or the cup may move radially while moving along a portion of its generally circular path to maintain register of these parts for the charge transferring operation. As shown in Fig. 1, the cups of the charging devices 12 move in register with molds 15 along a portion of the circular path 20 that is indicated at X. Any suitable known means for causing this coincidence of movements of the respective charging devices and of the molds to be charged may be employed.

As shown in Fig. 3, the glass charge 17 has been lifted into the cavity of the mold 15 and compacted upwardly therein until a portion of the glass of the charge has been pressed into the space around a depending neck pin 21 in the neck-forming portion of the parison or blank mold. This has been accomplished by lifting the movable bottom of the cup of the charging device after the latter is in register and close contact with the lower end of the mold 15. Any suitable means for raising the ram or plunger 14 to effect this forcible displacement of the glass charge from the charging device to the mold may be employed. If desired, suction may be applied to the neck portion of the mold during the charging of such mold by the use of the charging device 12.

In order to assure proper engagement and alignment of the cup of the charging device with the mold, the body of the cup of the charging device may be formed with a head portion 22 that is counterbored at 22a to provide a closely fitting seat for the extreme lower end portion of the body of the mold 15. The inner wall of the counterbored head 22 may be beveled or flared outwardly at its upper end, as indicated at 23, so as to guide the lower end portion of the mold 15 accurately to its seat in the head 22 should these parts be slightly out of axial alignment when they are moved together.

A dipping movement of the mold 15, as the mold and cup move into approximate register with each other, may be employed to effect seating of the mold 15 in the head of the cup of the charging device. To relieve shock as these parts move into engagement with each other and to maintain such engagement while the mold is being charged, the cup of the charging device may be supported resiliently, as on a coil spring 24 that is disposed between the head 22 and an upwardly facing shoulder 25 on an annular holder 26 which surrounds the body of the cup and rests upon the cup-carrier 18. As shown in Figs. 2 and 3, the lower end portion of the cup body extends loosely through an opening in the carrier 18 and is threadedly engaged by a nut 27, which abuts the lower surface of the carrier.

After the charge has been lifted upwardly from the cup of the charging device into the mold 15 and has been compacted therein, as shown in Fig. 3, a relative movement between the mold and the cup may be produced, as by raising the mold, so as to permit the paths of movement of the cup and of the charged mold to diverge. The charged mold may proceed along the circular path 20, moving in the direction indicated by the arrow in Fig. 1.

After a mold 15 has been charged in the manner just described, the neck pin 21 for that mold may be withdrawn, a blowhead 28 be superimposed on the neck portion of the mold, and blowing pressure applied to the initial blow aperture that remained after the withdrawal of the neck pin. This will cause the formation of a bubble, such as that indicated at 29, Fig. 4, in the glass in the mold 15. For the formation of the bubble 29, the lower or bottom end of the mold may be left open, so as to permit extrusion of sufficient glass to provide space for the bubble.

As the charged mold 15 approaches the station Y, Fig. 1, and after the bubble 29 has been formed therein, the body portion of such mold may be opened, as shown for the mold 15 at the station Y. The blank that has been formed in such mold may remain suspended from the neck portion of the mold 15 and also may be supported at its bottom by a bottom plate 30, as shown in Fig. 5. By the time this blank or parison reaches the station Y, the halves of a blow mold 31 will have been closed about it. As shown diagrammatically in Fig. 1, a blow mold 31 is associated with each blank or parison mold 15. The blow molds move around the axis 19 in a path generally corresponding with that of the path 20, although each blow mold may be supported, as on a swingable arm 32, for limited swinging movement relatively to its associated blank mold.

After the blow mold has closed about the blank, such blow mold may remain closed until it has passed the station indicated at Z in Fig. 1. During a portion of this period of travel, as from the station Y to the station indicated at W, the neck ring portion of the parison mold may continue to engage the neck portion of the article being made and blowing pressure may be applied through such neck ring. The blow mold and the aforesaid neck ring then may be separated, as by opening the neck ring and swinging the blow mold laterally as a unit away from the position at which the associate blank mold will be closed. During a further portion of the travel of the blow mold, as from the station Y to the station A, a blowhead, such as is indicated at 33 in Fig. 6 may be associated with the blow mold and further blowing therethrough may be employed in the production of the finally blown article, as the bottle 34, Fig. 6. After moving past the station Z, Fig. 1, the blow mold may be opened and the finished article removed in any suitable known manner and by the use of any suitable known instrumentality.

It, of course, will be understood that each of the several blank molds will be charged in its turn as it travels in register with the cup of one of the charging devices. The several charging devices are employed sequentially in charging the molds 15.

By the use of the herein described charging means, the upright molds of a machine of the Owens type may be charged with sufficient glass to form "full blanks" therein, without the necessity of dipping these molds into contact with glass of a gathering pool and without employing instrumentalities heretofore required for the charging of such molds. After the charging of the molds, the operations of forming the charges into articles of glassware may proceed according to the steps of the usual Owens suction machine process, some of which steps have been briefly pointed out in the foregoing description.

The showing of apparatus for effecting the several operations subsequent to the charging of each of a series of blank molds of a forming machine of the Owens type has been diagrammatic, for the reason that such structure forms no part of the present invention. For a like reason, I have deemed it unnecessary to show any particular mechanism for effecting the hereinbefore described cooperative movements of the charging devices and of the molds to be charged. Various means for effecting cooperative movements of a mold and of a device that is to move in register with the mold for the time required to transfer a charge to the mold are known in the art. In carrying out the present invention, any suitable means for effecting the required cooperative movements of the several parts may be employed and such means may vary according to particular service conditions or requirements.

Obviously, the charging of the molds may be effected at a particular station at which each of such molds is temporarily halted should the forming machine to which the invention is applied have step-by-step or intermittent movements instead of continuous operating movements.

I claim:

In the method of manufacturing articles of hollow glassware, the steps of laterally moving an open bottomed upright parison mold continuously in a closed path, bringing a preformed separated charge of glass of sufficient size to fill the cavity of the parison mold for substantially the full length thereof and of a shape corresponding generally with the shape of the body of the parison mold cavity to a position directly beneath and in axial alignment with said moving upright mold when said mold is at one place along its path of movement, moving said separated charge laterally in register with said mold cavity while said mold moves along part of its path of movement and, during such register, lifting the charge of glass as a unit to position it within the cavity of the moving mold, compacting the mold charge in the mold cavity to fill substantially the entire cavity of the parison mold with a full length solid blank, blowing a bubble in the glass blank in the parison mold, thereafter transferring said glass blank to a final blow mold, and enlarging the bubble by blowing pressure applied to the interior of the glass blank in the final blow mold to form the desired article of hollow glassware.

GEORGE E. ROWE.